United States Patent [19]

Moore

[11] Patent Number: 5,438,457
[45] Date of Patent: Aug. 1, 1995

[54] OBSTRUCTION ELIMINATOR

[76] Inventor: Phillip H. Moore, 404 W. Roswell Ave., Nedrow, N.Y. 13120

[21] Appl. No.: 285,107

[22] Filed: Aug. 3, 1994

[51] Int. Cl.⁶ .................... G02B 5/08; G02B 7/182; B60R 1/06
[52] U.S. Cl. .................... 359/855; 359/865; 359/872; 359/881; 248/467; 248/474; 248/480
[58] Field of Search .............. 359/850, 855, 865, 872, 359/881; 248/467, 474, 476, 480

[56] References Cited

U.S. PATENT DOCUMENTS

| | | | |
|---|---|---|---|
| 1,006,315 | 10/1911 | Toth | 248/467 |
| 1,562,335 | 11/1925 | Jones | 359/855 |
| 2,413,894 | 1/1947 | Sorensen | 359/855 |
| 3,305,202 | 2/1967 | Christenson | 248/467 |
| 4,208,104 | 6/1980 | Peterson | 359/855 |
| 4,940,320 | 7/1990 | Trebble | 359/865 |

FOREIGN PATENT DOCUMENTS

| | | | |
|---|---|---|---|
| 6407141 | 12/1964 | Netherlands | 359/865 |
| 0496192 | 3/1937 | United Kingdom | 359/855 |

*Primary Examiner*—Ricky D. Shafer

[57] ABSTRACT

A new and improved obstruction eliminator with a circular base having a mounting end, a receiving end, and an intermediate surface therebetween. The mounting end has a suction cup thereaffixed. The intermediate surface has a pair of apertures diametrically opposed. A lever is rotatably received within the apertures of the intermediate surface of the circular base. A securement arm is secured to the lever and secured to the suction cup. A support post is secured within the receiving end of the circular base. Two mirror assemblies, each of which are rotatably secured to the support post. Two adjustable mirrors, each of which are rotatably secured to the two mirror assemblies.

3 Claims, 4 Drawing Sheets

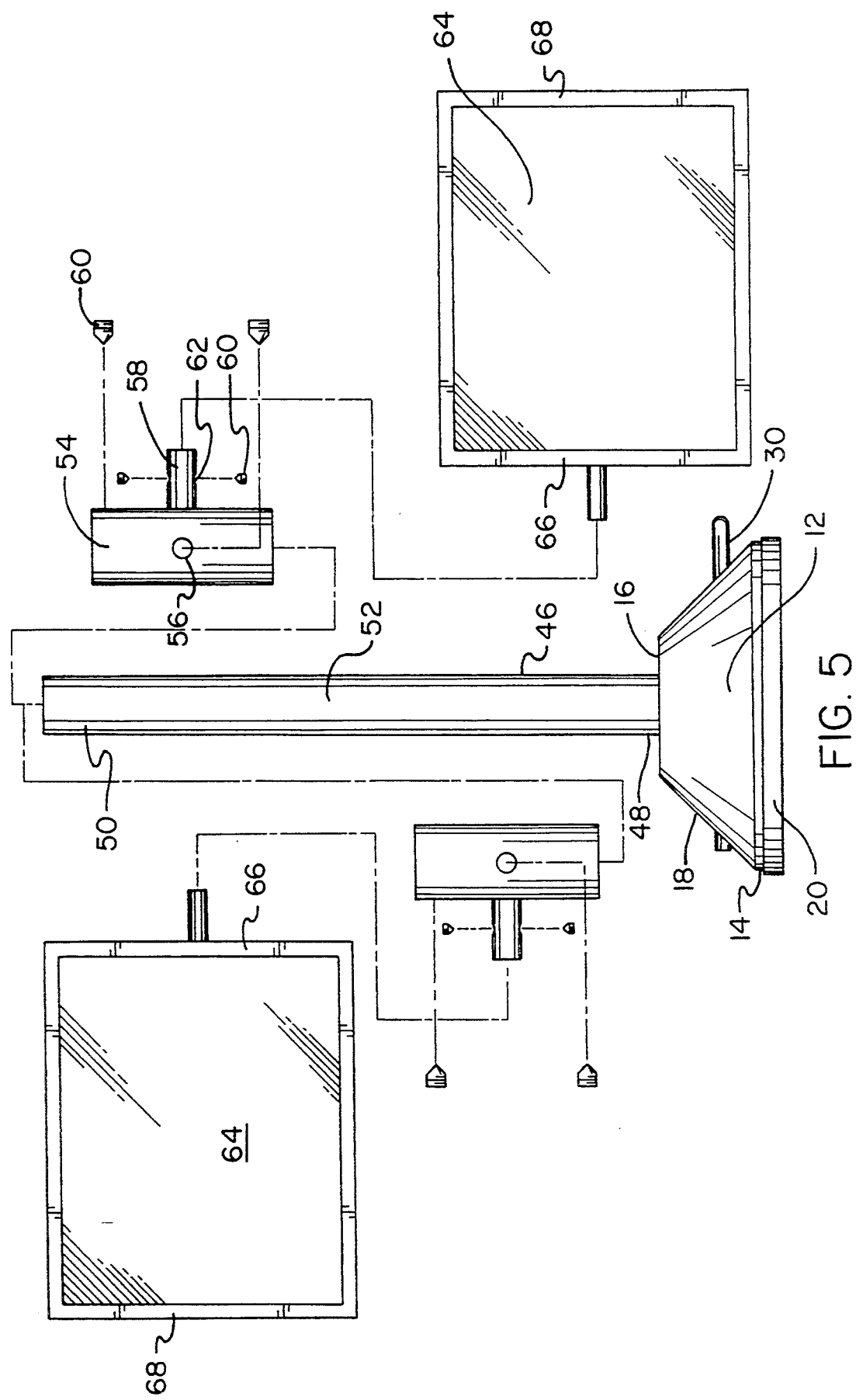

OBSTRUCTION ELIMINATOR

BACKGROUND OF THE INVENTION

1. Field of the Invention

The present invention relates to an obstruction eliminator and more particularly pertains to enabling a driver to see beyond obstruction and into oncoming traffic with an obstruction eliminator.

2. Description of the Prior Art

The use of rear view mirrors is known in the prior art. More specifically, rear view mirrors heretofore devised and utilized for the purpose of viewing incoming automobiles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,500,063 to Schmidt et al. discloses a fender mount for a mirror.

U.S. Pat. No. 4,073,461 to Lopez et al. discloses a fender-mount rear view mirror support.

U.S. Pat. No. 3,788,734 to McDuffee, Sr. discloses fender mounted rear view mirror.

U.S. Pat. No. Des. 307,570 to Swanson discloses the ornamental design for a front fender mounted automobile rear view mirror.

U.S. Pat. No. 3,482,811 to Zent discloses a device for mounting a mirror on an automobile.

U.S. Pat. No. 5,111,342 to Quesada discloses a hitch-viewing mirror assembly employing suction cups and tip rests for use on towing vehicle.

While these devices fulfill their respective, particular objective and requirements, the aforementioned patents do not describe an obstruction eliminator for enabling a driver to see beyond obstruction and into oncoming traffic.

In this respect, the obstruction eliminator according to the present invention substantially departs from the conventional concepts and designs of the prior art, and in doing so provides an apparatus primarily developed for the purpose of enabling a driver to see beyond obstruction and into oncoming traffic.

Therefore, it can be appreciated that there exists a continuing need for new and improved obstruction eliminator which can be used for enabling a driver to see beyond obstruction and into oncoming traffic. In this regard, the present invention substantially fulfills this need.

SUMMARY OF THE INVENTION

In the view of the foregoing disadvantages inherent in the known types of rear view mirrors now present in the prior art, the present invention provides an improved obstruction eliminator. As such, the general purpose of the present invention, which will be described subsequently in greater detail, is to provide a new and improved obstruction eliminator and method which has all the advantages of the prior art and none of the disadvantages.

To attain this, the present invention essentially comprises a circular base having a mounting end, a receiving end, and an intermediate surface therebetween. The mounting end has a suction cup thereaffixed. The suction cup has an inner surface and an outer surface. The receiving end has a securement aperture thereon. The intermediate surface has a pair of apertures diametrically opposed. The device contains a lever having a first end, a second end, and an intermediate extent therebetween. The first end is rotatably received within the apertures of the intermediate surface of the circular base. The second end has an L-shape. A securement arm has a first end and a second end. The first end has a bracket thereon. The bracket is secured to the intermediate extent of the lever. The second end is secured to the inner surface of the suction cup. The lever has two adjustment positions. The first position turns the second end of the lever upwardly thereby lowering the securement arm to lock the suction cup. The second position turns the second end of the lever downwardly thereby raising the securement arm to release the suction cup. The device contains a support post having a first end, a second end, and an intermediate extent therebetween. The first end is secured within the securement aperture of the receiving end of the circular base. The device contains two mirror assemblies. Each of the two mirror assemblies has a hollow interior. Each mirror assembly has an aperture formed on opposite sides thereof and a female receiving post secured thereon between the apertures thereof. Each of the two mirror assemblies are rotatably secured to the intermediate extent of the support post by a fastening means fitted through each aperture. Each female receiving post has a pair of apertures therethrough. The device contains two adjustable mirrors. Each of the two mirrors has an inner edge and an outer edge. Each inner edge has a male securement post secured thereto. Each male securement post is rotatably secured to the corresponding female receiving post of the two mirror assemblies by a fastening means fitted through the pair of apertures therethrough.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved obstruction eliminator which has all the advantages of the prior art rear view mirrors and none of the disadvantages.

It is another object of the present invention to provide a new and improved obstruction eliminator which may be easily and efficiently manufactured and marketed.

It is a further object of the present invention to provide a new and improved obstruction eliminator which is of durable and reliable construction.

An even further object of the present invention is to provide a new and improved obstruction eliminator which is susceptible of a low cost of manufacture with regard to both materials and labor, and which accordingly is then susceptible of low prices of sale to the consuming public, thereby making such an obstruction eliminator economically available to the buying public.

Still yet another object of the present invention is to provide a new and improved obstruction eliminator which provides in the apparatuses and methods of the prior art some of the advantages thereof, while simultaneously overcoming some of the disadvantages normally associated therewith.

Even still another object of the present invention is to provide a new and improved obstruction eliminator for enabling a driver to see beyond obstruction and into oncoming traffic.

Lastly, it is an object of the present invention to provide a new and improved obstruction eliminator with a circular base having a mounting end, a receiving end, and an intermediate surface therebetween. The mounting end has a suction cup thereaffixed. The intermediate surface has a pair of apertures diametrically opposed. A lever is rotatably received within the apertures of the intermediate surface of the circular base. A securement arm is secured to the lever and secured to the suction cup. A support post is secured within the receiving end of the circular base. Two mirror assemblies, each of which are rotatably secured to the support post. Two adjustable mirrors, each of which are rotatably secured to the two mirror assemblies.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an exploded view of the present invention illustrating all components.

The same reference numerals refer to the same parts through the various Figures.

DESCRIPTION OF THE PREFERRED EMBODIMENT

Figure 1:
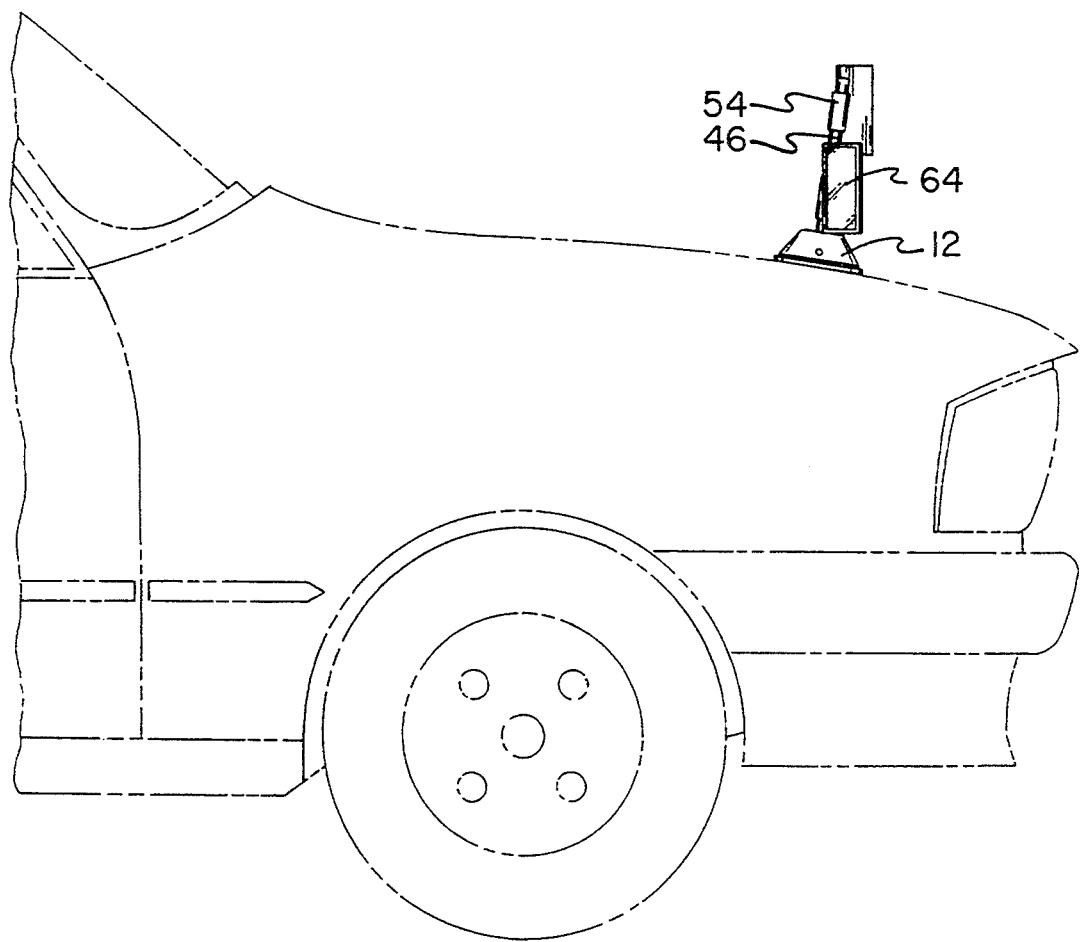
FIG. 1 is a side view of the present invention illustrated in place atop an automobile.
Figure 2:
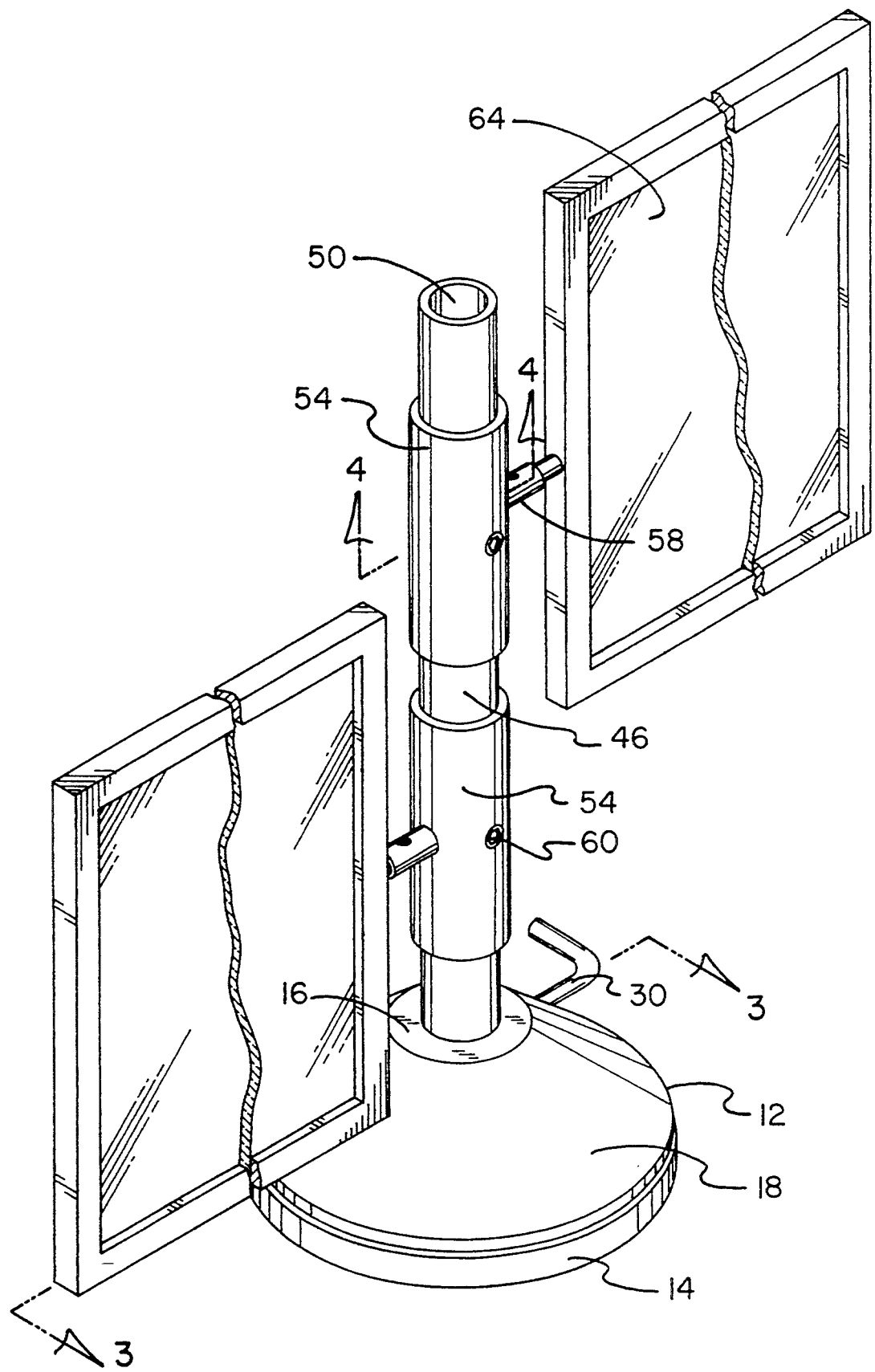
FIG. 2 is a perspective view of the preferred embodiment of the obstruction eliminator constructed in accordance with the principles of the present invention.
Figure 3:
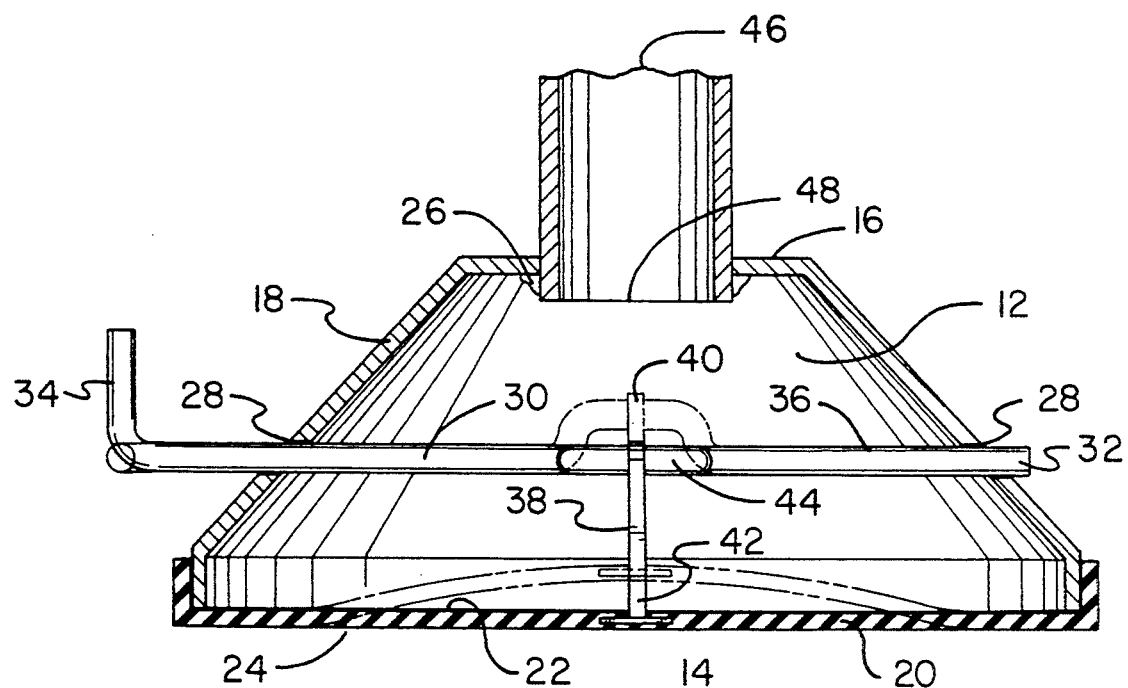
FIG. 3 is a cross-sectional view of the present invention taken along line 3—3 of FIG. 2.
Figure 4:
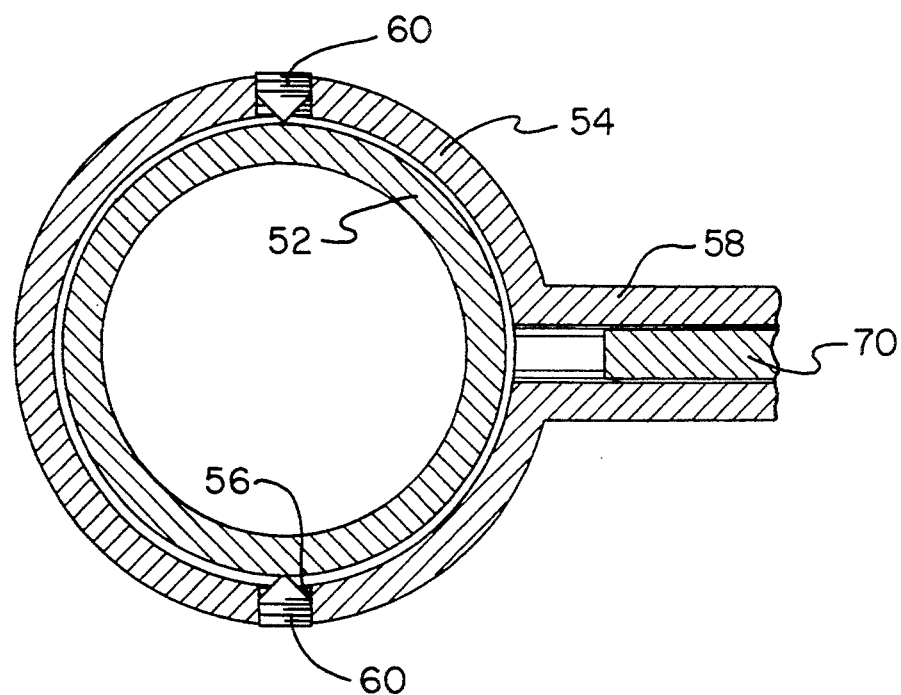
FIG. 4 is a cross-sectional view of the present invention taken along line 4—4 of FIG. 2.

With reference now to the drawings, and in particular, to FIG. 1 thereof, the preferred embodiment of the new and improved obstruction eliminator embodying the principles and concepts of the present invention and generally designated by the reference number 10 will be described.

Specifically, it will be noted in the various Figures that the device relates to a new and improved obstruction eliminator for enabling a driver to see beyond obstruction and into oncoming traffic. In its broadest context, the device consists of a circular base, a lever, a support post, two mirror assemblies, and two adjustable mirrors.

The device 10 contains a circular base 12 having a mounting end 14, a receiving end 16, and an intermediate surface 18 therebetween. The intermediate surface tends to slope outwardly from the receiving end to the mounting end. The mounting end 14 has a suction cup 20 thereaffixed. The mounting end corresponds to a hood of a car. The suction cup 20 has an inner surface 22 and an outer surface 24. The outer surface 24 of the suction cup 20 functions to grip the hood of the car. The suction cup 20 is preferably constructed of a synthetic rubber that would prevent the device 10 from causing any scratches to the hood. The receiving end 16 has a securement aperture 26 thereon. The intermediate surface 18 has a pair of apertures 28 diametrically opposed.

The device 10 contains a lever 30 having a first end 32, a second end 34, and an intermediate extent 36 therebetween. The first end 32 is rotatably received within the apertures 28 of the intermediate surface 18 of the circular base 12. The second end 34 has an L-shape. The L-shape serves as the handle for the device 10. A securement arm 38 has a first end 40 and a second end 42. The first end 40 has a bracket 44 thereon. The bracket 44 is secured to the intermediate extent 36 of the lever 30. The second end 42 is secured to the inner surface 22 of the suction cup 20. The lever 30 has two adjustment positions. The first position turns the second end 34 of the lever 30 upwardly thereby lowering the securement arm 38 to lock the suction cup 20. The first position permits a vehicle to be driven with the suction cup 20 securely fastened to the hood. The second position turns the second end 34 of the lever 30 downwardly thereby raising the securement arm 38 to release the suction cup 20. The adjustment positions behave similarly to that of a desk mounted pencil sharpener. The adjustment positions allow the device 10 to be portable and therefore transferrable if needed.

The device 10 contains a support post 46 having a first end 48, a second end 50, and an intermediate extent 52 therebetween. The first end 48 is secured within the securement aperture 26 of the receiving end 16 of the circular base 12. Another option for the support post is too have it constructed in two parts allowing one part to rotate within the other. The preferable construction of the support post 46 would be a rigid plastic.

The device 10 contains two mirror assemblies 54. Each of the two mirror assemblies 54 has a hollow interior. Each mirror assembly has an aperture 56 formed on opposite sides thereof and a female receiving post 58 secured thereon between the apertures 56 thereof. Each of the two mirror assemblies 54 are rotatably secured to the intermediate extent 52 of the support post 46 by a fastening means 60 fitted through each aperture 56. Each female receiving post 58 has a pair of apertures 62 therethrough. The most important feature of the device is to allow the mirror assemblies 54 to be positioned at the best possible angle for the user to effectively employ the device 10.

The device 10 contains two adjustable mirrors 64. Each of the two mirrors 64 has an inner edge 66 and an outer edge 68. Each inner edge 66 has a male securement post 70 secured thereto. Each male securement post 70 is rotatably secured to the corresponding female receiving post 58 of the two mirror assemblies 54 by a fastening means 60 fitted through the pair of apertures therethrough 62. The male securement posts allow the mirrors 64 to be adjusted up or down as the mirror assemblies 54 adjust from side to side.

The present invention basically is two mirrors that attach to the hood of a car and enable drivers to see beyond obstructions and into oncoming traffic.

The device consists of two adjustable mirrors connected to a common support post. The post extends up from the center of a circular base which has a suction cup located in the bottom surface. A lever extends from one side of the base and creates a vacuum between the base and mounting surface, similar to a portable desktop pencil sharpener. The mirrors are attached to the support with the common ball and socket assemblies used on most automotive mirrors. The suction cup is made of rubber, while the post and base are plastic. The mirrors are 8 inches wide and can be adjusted up or down on the post or side to side. The post is twelve inches high to enable the driver to see around corners without being an obstruction itself.

After the driver places the mirrors on the hood of the car, they can be adjusted to permit viewing both ways as they enter a road from a side street or alleyway. The next time they need to pull out into traffic, the mirrors enable them to see around any obstructions or parked vehicles before the front of the vehicle extends out into traffic.

The device is simple enough to use, so that virtually anyone can attach it to the car without assistance from a professional mechanic. The unit could eventually be built into the car, so it could be adjusted from inside as with side-view mirrors.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An obstruction eliminator comprising:
   a circular base having a mounting end, a receiving end, and an intermediate surface therebetween, the mounting end having a suction cup thereaffixed, the suction cup having an inner surface and an outer surface, the receiving end having a securement aperture thereon, the intermediate surface having a pair of apertures diametrically opposed;
   a lever having a first end, a second end, and an intermediate extent therebetween, the first end rotatably received within the apertures of the intermediate surface of the circular base, the second end having an L-shape, a securement arm having a first end and a second end, the first end having a bracket thereon, the bracket secured to the intermediate extent of the lever, the second end secured to the inner surface of the suction cup, the lever having two adjustment positions, the first position turning the second end of the lever upwardly thereby lowering the securement arm to lock the suction cup, the second position turning the second end of the lever downwardly thereby raising the securement arm to release the suction cup;
   a support post having a first end, a second end, and an intermediate extent therebetween, the first end secured within the securement aperture of the receiving end of the circular base;
   two mirror assemblies, each of the two mirror assemblies having a hollow interior, each of the two mirror assemblies having an aperture formed on opposite sides thereof, and a female receiving post secured thereon between the apertures thereof, each of the two mirror assemblies rotatably secured to the intermediate extent of the support post by a fastening means fitted through each aperture, each female receiving post having a pair of apertures therethrough;
   two adjustable mirrors, each of the two mirrors having an inner edge and an outer edge, each inner edge having a male securement post secured thereto, each male securement post rotatably secured to the corresponding female receiving post of the two mirror assemblies by a fastening means fitted through the pair of apertures therethrough.

2. The obstruction eliminator as described in claim 1 wherein the fastening means are set screw and socket assemblies.

3. The obstruction eliminator as described in claim 2 wherein the suction cup is made from a synthetic rubber.

* * * * *